United States Patent [19]

Schlosser et al.

[11] Patent Number: 5,070,776
[45] Date of Patent: Dec. 10, 1991

[54] PORTABLE GAS GRILL ENHANCEMENTS

[75] Inventors: Erich J. Schlosser, Barrington; Ronald W. Simpkins, Bensenville; Andrzej Leja, Palatine; J. Michael Alden, Lake Zurich, all of Ill.

[73] Assignee: Weber-Stephen Products Co., Palatine, Ill.

[21] Appl. No.: 540,294

[22] Filed: Jun. 19, 1990

Related U.S. Application Data

[63] Continuation of Ser. No. 231,778, Aug. 12, 1988, abandoned.

[51] Int. Cl.$^5$ .............................................. A47J 37/00
[52] U.S. Cl. .................................. 99/450; 126/25 R; 126/41 R; 126/334
[58] Field of Search .............. 99/401, 402, 410–412, 99/414, 416, 417, 421 H, 424, 448–450, 481–483; 126/25 R, 41 R, 218, 333, 334, 340; 211/82, 84, 110, 113, 116, 118; 312/269

[56] References Cited

U.S. PATENT DOCUMENTS

| | | | |
|---|---|---|---|
| 102,977 | 5/1870 | Simonson | 312/269 X |
| 861,114 | 7/1907 | Harrild | 312/269 |
| 1,252,572 | 1/1918 | Holmes | 312/269 X |
| 2,187,029 | 1/1940 | Hevers | 312/269 X |
| 2,349,307 | 5/1944 | Reeves | 126/333 X |
| 2,886,386 | 5/1959 | Spitzer | 126/333 |
| 3,085,562 | 4/1963 | Persinger | 126/25 R |
| 3,230,948 | 1/1966 | Schmitt | 99/421 X |
| 3,520,290 | 7/1970 | Winters | 126/334 X |
| 3,611,911 | 10/1971 | Martin | 99/482 |
| 3,938,495 | 2/1976 | Bauer | 126/25 R X |
| 3,967,613 | 7/1976 | Rybak | 126/25 R X |
| 4,130,052 | 12/1978 | Jacobson | 99/482 X |
| 4,140,049 | 2/1979 | Stewart | 99/482 |
| 4,150,610 | 4/1979 | Ferrara | 99/421 H X |
| 4,667,652 | 5/1987 | Bunton | 126/25 R |
| 4,677,964 | 7/1987 | Lohmeyer | 126/41 R |
| 4,697,506 | 10/1987 | Ducate, Jr. | 99/482 |
| 4,721,037 | 1/1988 | Blosnich | 126/25 R X |
| 4,727,853 | 3/1988 | Stephen | 99/444 X |
| 4,770,157 | 9/1988 | Shepherd | 126/25 R |

Primary Examiner—Philip R. Coe
Assistant Examiner—Mark Spisich
Attorney, Agent, or Firm—Wallenstein Wagner & Hattis, Ltd.

[57] ABSTRACT

A gas grill including a fire box and a cover hinged hereto has a cradle pivotally supported in the cover and positioned to be within the cover when the cover is opened and suspended over the cooking grid when the cover is closed. The portable grill also has a smoker attachment which is supported above the heat producing section. A work supporting surface is pivoted on the frame of the grill and has a novel latch mechanism for holding the surface in the horizontal position.

10 Claims, 6 Drawing Sheets

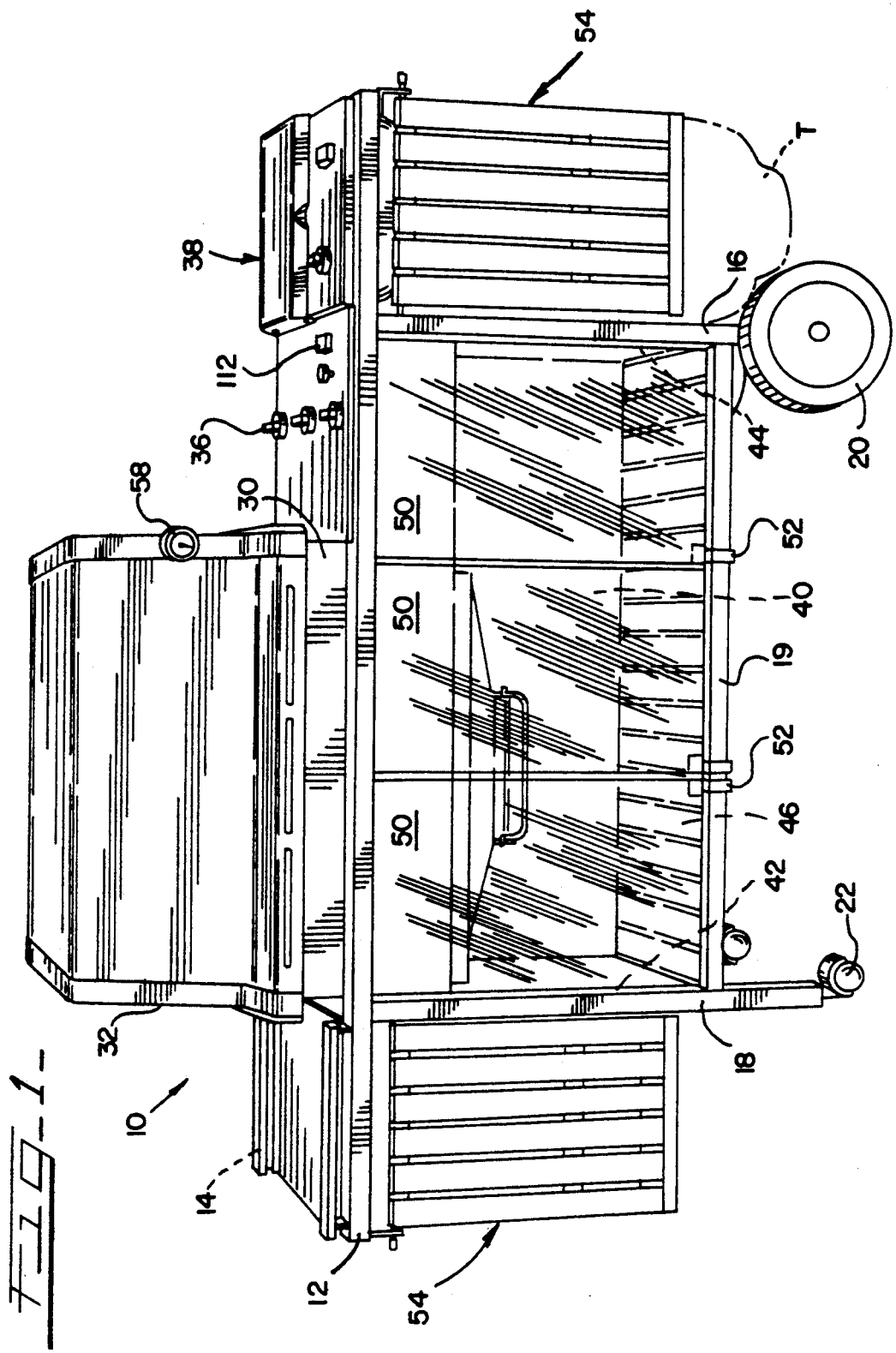

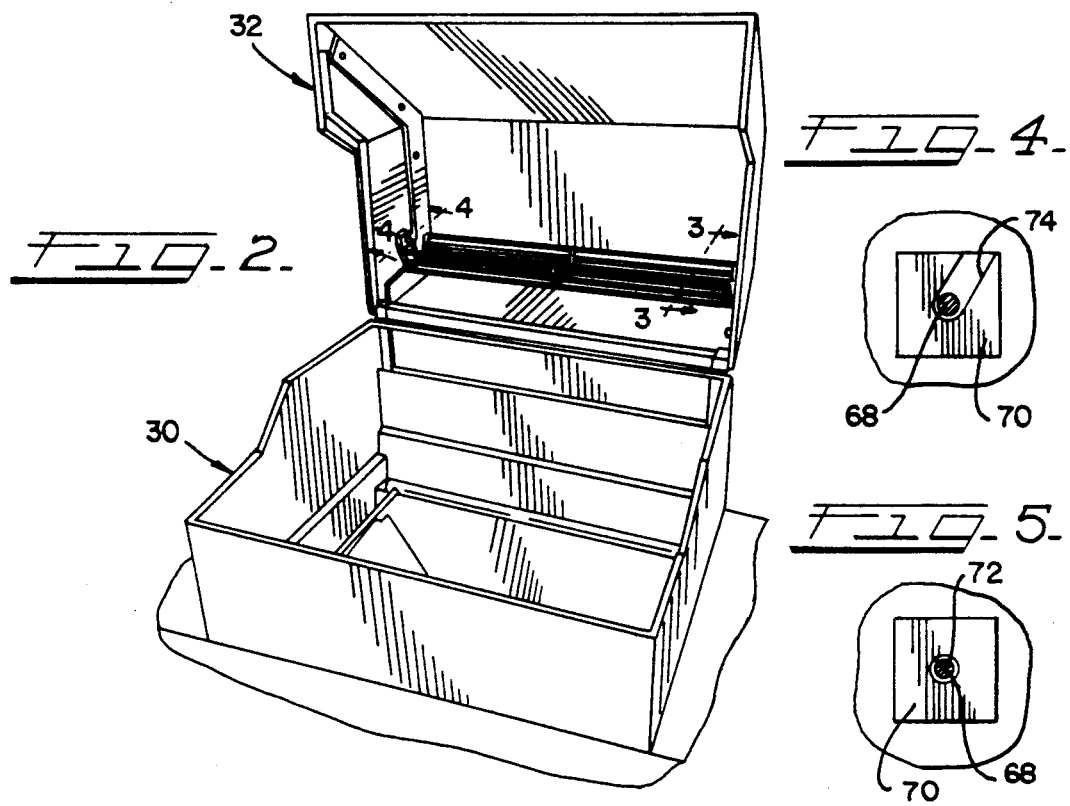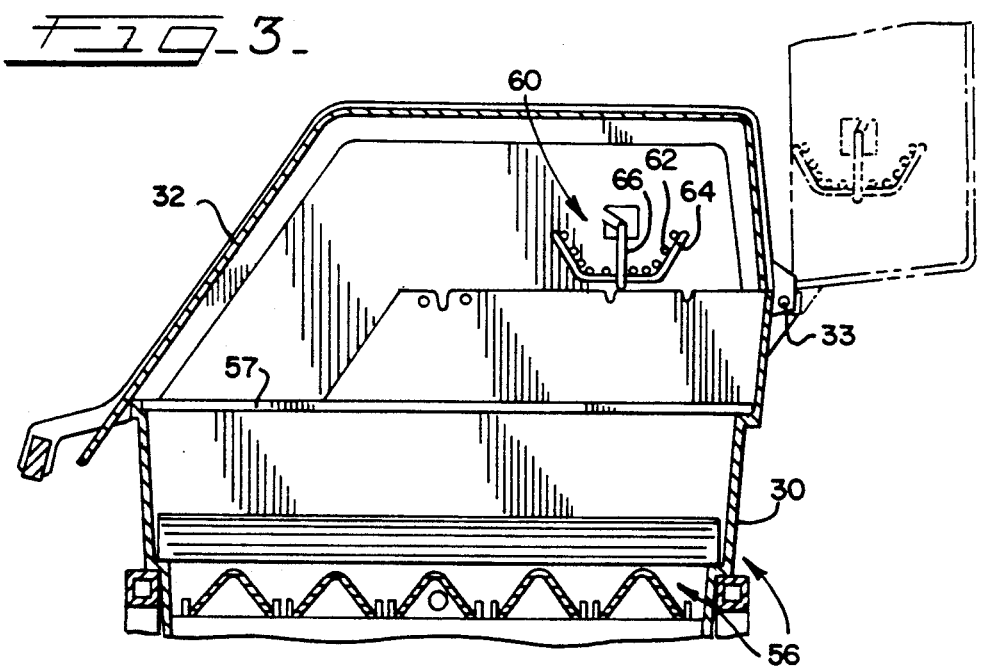

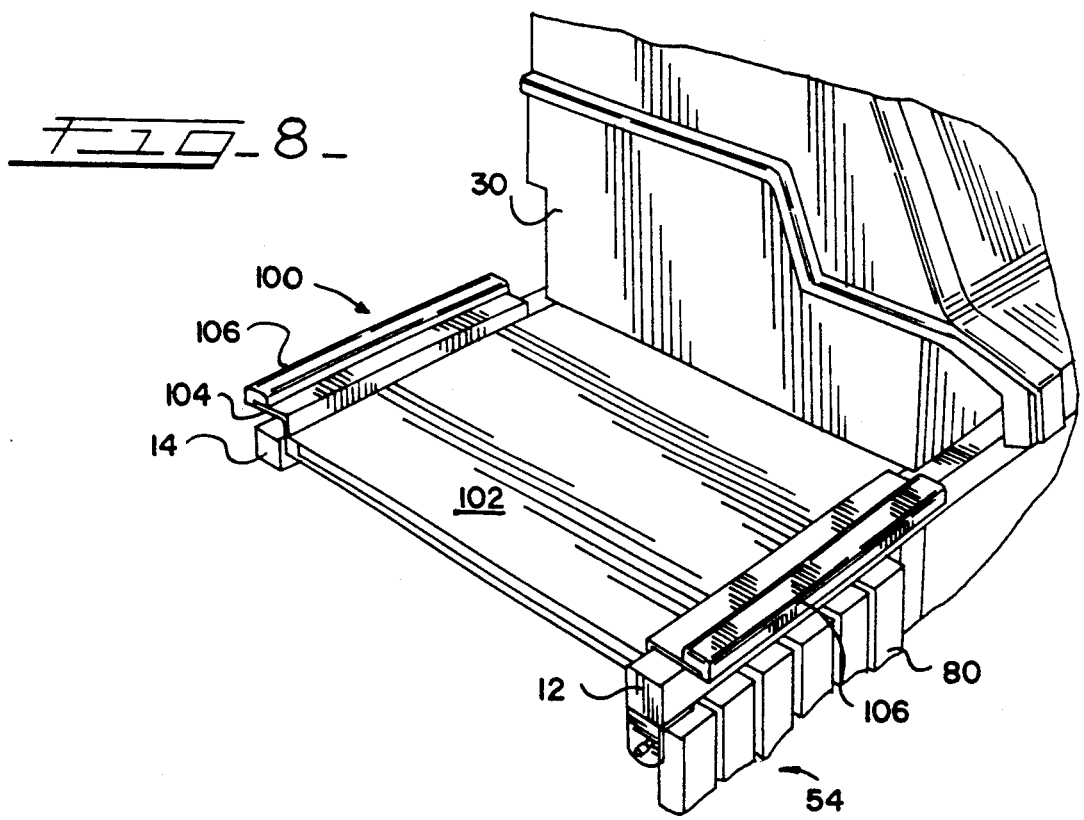

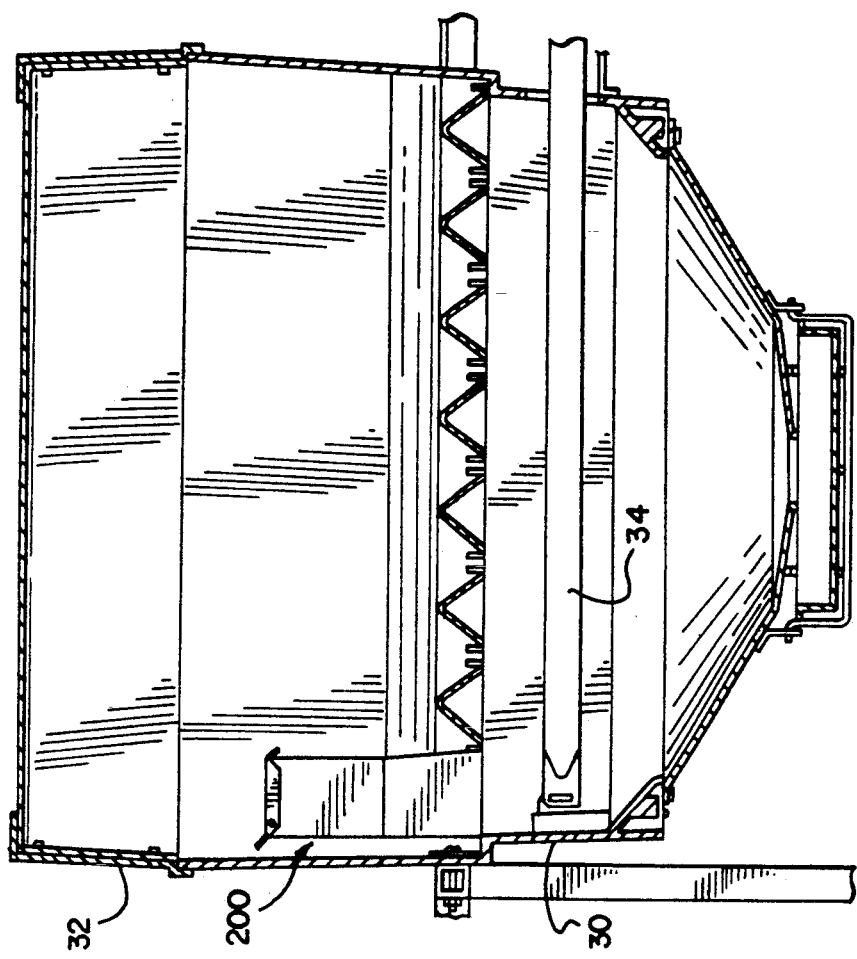
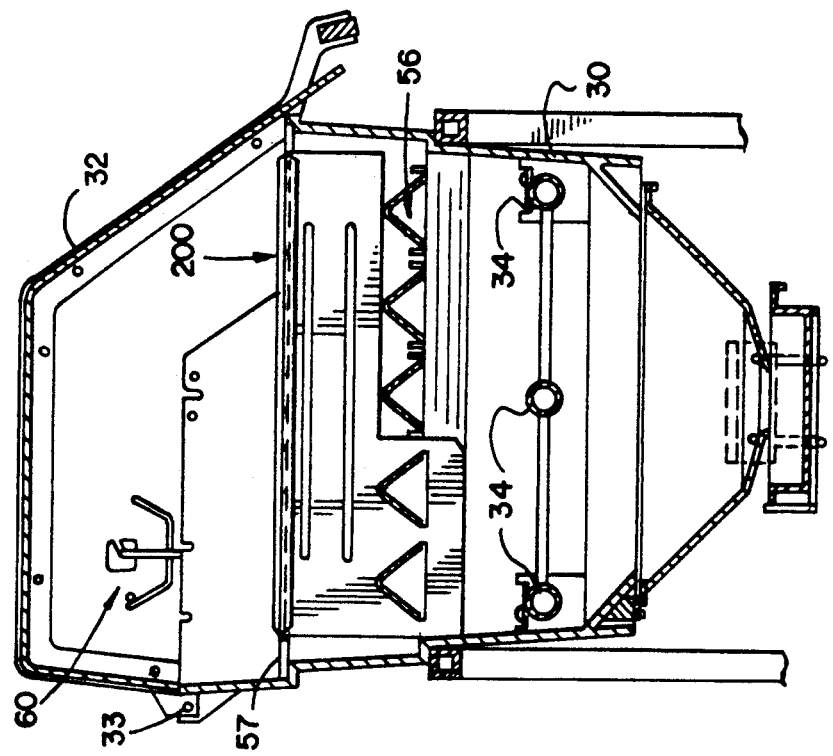

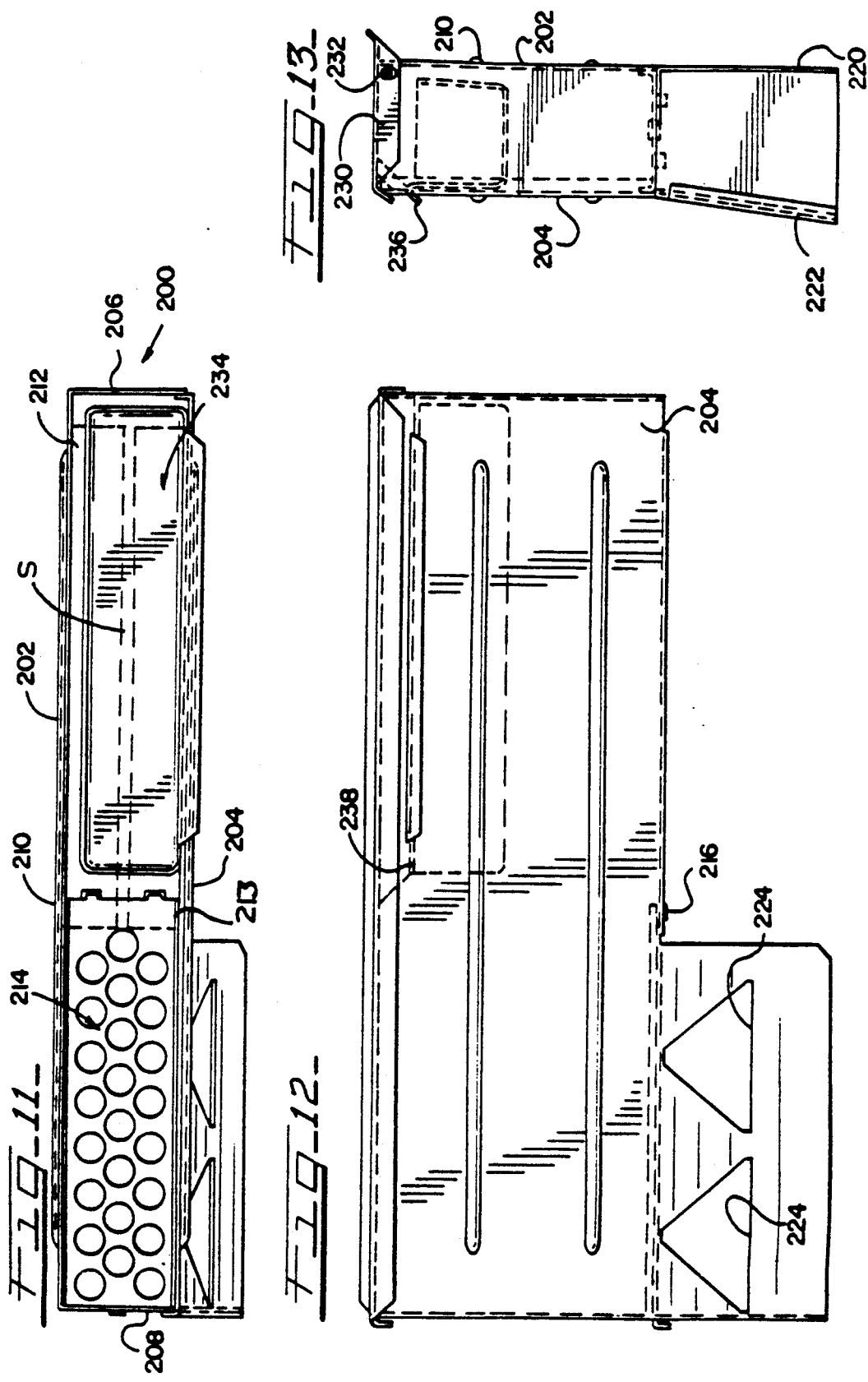

PORTABLE GAS GRILL ENHANCEMENTS

This is a continuation of copending application Ser. No. 07/231,778 filed on Aug. 12, 1988; now abandoned.

DESCRIPTION

1. Technical Field

The present invention relates generally to outdoor cooking devices and, more particularly, to portable gas grills.

2. Background Prior Art

Portable gas grills have become increasingly popular in recent years because of the interest in outdoor cooking. Conventionally, portable gas grills include a burner assembly adjacent the lower portion of a firebox with a cooking grid supported along the upper edge and lava rock located on a bed between the two. The lava rock absorbs the heat from the burning gas and thus provides a generally uniform heat producing means for the food being cooked.

Recently, a portable gas grill has been developed by the assignee of the present invention which eliminates the need for lava rock and such grill is disclosed in U.S. Pat. No. 4,677,964. The portable grill disclosed therein has revolutionized the gas grill industry by eliminating the need for the lava rock, which traditionally had to be replaced periodically. The gas grill disclosed therein utilizes sear bars which are positioned between the cooking grid and the gas burners to vaporize any greases that emanate from the food being cooked.

While the new gas grill has received a remarkable degree of consumer acceptance, manufacturers are constantly striving to improve the product to enhance its appeal to the consumer. Thus, the present invention is directed towards improvements in the gas grill disclosed in the above patent.

SUMMARY OF THE INVENTION

According to the present invention, a gas grill of the type disclosed in the above-mentioned patent, incorporates numerous accessories that make the grill more pleasing to the potential customer.

More specifically, the portable gas grill which includes a firebox or housing that has a cover hinged thereto and incorporates a pivoted food supporting rack or cradle that is positioned within the cover to be suspended over the cooking grid when the cover is closed and located totally within the confines of the cover away from the cooking grid when the cover is open. The cradle consists of a wire rack that has pivot pins at opposite ends thereof which are received onto support brackets that are preferably integral with the cover.

According to another aspect of the present invention, the gas grill has a sear bar assembly positioned between the gas burners in the lower section and the cooking grid with a smoker attachment adapted to be supported on the sear bar assembly. The smoker attachment includes a generally rectangular housing that is closed at its bottom and has depending legs or plates extending from opposite edges of the bottom which have apertures that receive at least a plurality of sear bars to position the smoker attachment within the fire chamber. The smoker attachment also has a cover hinged to an upper edge thereof and a water tray is suspended under the cover by one edge of the housing.

The portable grill has a frame structure which supports the firebox and cover with a work surface pivoted on the frame structure. The work surface is held in a stored position and a working position through a novel latch mechanism including a guide bar and a bracket with a notch at one end.

BRIEF DESCRIPTION OF DRAWINGS

FIG. 1 is a perspective view of the gas grill having the features of the present invention incorporated therein;

FIG. 2 is a fragmentary perspective view with the cover in the open position;

FIG. 3 is a cross-sectional view through the grill;

FIG. 4 is a view taken along line 4—4 of FIG. 2;

FIG. 5 is a view taken along line 5—5 of FIG. 2;

FIG. 8 is a fragmentary perspective view of one end of the grill;

FIG. 9 is a cross-sectional view showing the smoker attachment in position;

FIG. 10 is a cross-sectional view of the grill showing the smoker attachment positioned therein;

FIG. 11 is a top view of the smoker attachment;

FIG. 12 is a side view of the smoker attachment; and,

FIG. 13 is an end view of the smoker attachment.

DETAILED DESCRIPTION

Figure 6:
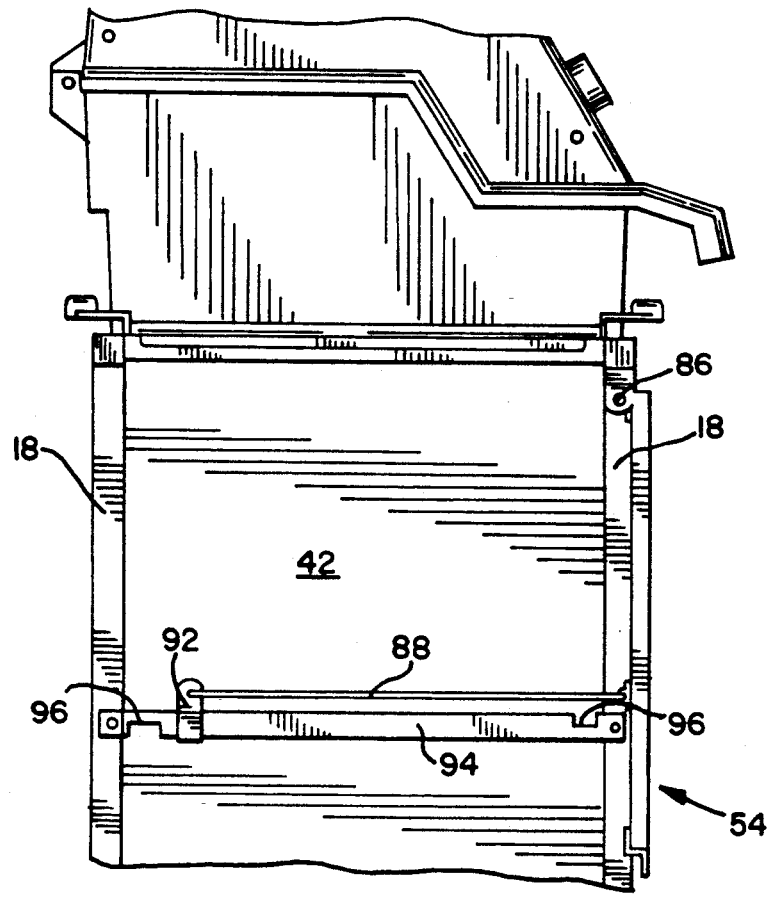
FIG. 6 is an end view of the frame structure.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 of the drawings shows a gas barbecue grill, generally designated by reference numeral 10. The gas barbecue grill is in many respects similar to the grill disclosed in U.S. Pat. No. 4,667,964, assigned to the Assignee of the present invention, and incorporated herein by reference.

The grill 10 includes a generally rectangular framework consisting of a pair of horizontal tubes 12 and 14 that are interconnected by cross-members (not shown). The side frame members 12 and 14 are supported through two pairs of depending posts or legs 16 and 18 interconnected by cross member 19. The depending posts 16 have wheels 20, while the depending posts 18 have universally rotatable casters 22. The frame structure supports a housing 30 that defines a fire chamber, as will be explained later. The housing 30 has a cover 32 hinged by hinge 33 and has a plurality of burner tubes 34 (FIG. 9) in the lower portion thereof. Gas is supplied to the burner tubes 34 from a tank T through suitable conduits and valves (not shown), which are controlled by control knobs 36. A side burner 38 is supported on the frame members 12 and 14. The side burner 38 is constructed in accordance with the teachings of a copending application Ser. No. 231,499, filed Aug. 12, 1988.

According to one aspect of the invention, the entire area between the front and rear posts 16 and 18 is completely enclosed. Thus, a closure member 40 extends between the rear posts 16 and 18 to completely enclose the area between the upper cross member 14 and lower cross-member 19. Likewise, an enclosure 42 encloses the space between the front posts or legs 18, while a plate 44 encloses the rear area between the posts 16. The bottom of the enclosure between the post 19 has a plurality of slats 46 which are spaced from each other to allow air flow into the enclosed area during cooking.

The front of the enclosed area is enclosed by three pivoted doors 50. The doors are preferably of the type that can be installed and removed by merely manipulating the door assembly, which is preferably formed of glass. Thus, the door assembly has a hinged axis defined by a lower fixed hinge pin received into a bracket having an aperture, while an upper pin is spring-biased outwardly and is received into a fixed bracket. Thus, the door can be installed by inserting the upper pin in the top bracket and forcing the door up to clear the lower bracket and the lower pin can then be dropped into the lower bracket. Preferably, each door has a locking clip 52 associated therewith.

The gas grill 10 also has a pair of work-supporting surfaces 54 located at opposite ends thereof and pivotally supported on the frame member 12, as will be described later. As disclosed in the above patent, the gas grill has first and second sets of sear bar grids 56 above the burner tubes 34 and below the cooking grid 57 (FIG. 3).

Most grills of this type have a warming section located somewhere above the cooking grid which supports the food. Conventionally, the warming section consists of a wire rack that is supported adjacent the area of the hinge between the housing and the cover on the rear portion of the grill. While such an arrangement provides the necessary function of keeping food or the products warm while not subjecting them to the direct heat that is directed to the cooking grid, several problems are apparent. One of the problems is that the wire rack partially obstructs access to the cooking grid adjacent the rear portion of the grill. Thus, when the entire cooking surface is required, it is customary to remove the warming grid temporarily which means it must be stored at some readily accessible place.

According to one aspect of the present invention, a unique warming device has been developed which automatically is moved from above the cooking grid when the cover is moved to the open position. Thus, as illustrated in FIGS. 2-5, the grill incorporates a cradle that is pivotally supported in the cover. As illustrated in FIGS. 2 and 3, the warming grid consists of a cradle 60 that includes a plurality of spaced wires 62 that are interconnected by transversely spaced cross wires 64. A pivot mechanism consisting of a wire 66 is located at each end and has a perpendicular offset portion 68 that is pivotally supported on a bracket 70. The first bracket at one end of the cover has a circular opening 72 which receives one pin 68 while the second bracket 70 has an elongated slot 74 which receives the other pin 68 at the opposite end. The brackets or support means 70 are preferably cast as embossments with the end pieces of the cover and the slot 74 is positioned such that the slot opens upwardly and away from the housing 30.

Thus, the wire rack or cradle can easily be assembled merely by insertion of one pin 68 into the opening 72 and then sliding the other pin 68 into the slot 74. The brackets 70 are positioned such that the wire rack or cradle is located entirely within the confines of the cover when the cover is in the open position illustrated in FIG. 2. When the cover is moved to the closed position illustrated in FIG. 3, the cradle or wire rack 60 is suspended over the cooking grid 57 so that the food supported thereon is subjected to the lower heat in the upper portion of the cover.

Figure 7:
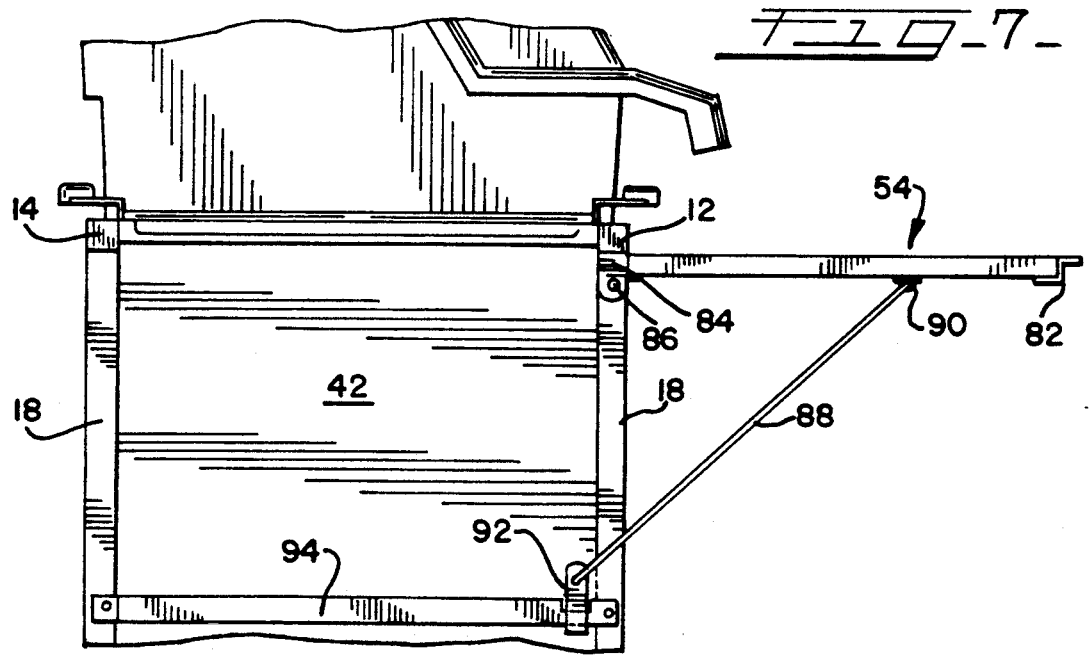
FIG. 7 is a view similar to FIG. 6 showing the working surface in the upright position.

According to another aspect of the present invention, each of the work supporting surfaces 54 is supported in a unique manner to be easily accessible and readily moved to the stored position. As illustrated in FIGS. 6-8, each work supporting surface consists of a plurality of slats 80 that are interconnected at opposite ends by generally Z-shaped brackets 82. The work supporting surfaces or shelves 54 are pivotally connected to brackets 84 depending from member 12 through pins 86.

A support rod 88 is pivotally supported at one end on a bracket 90 secured to the bottom surface of the shelf 54 and has a bracket 92 secured to the opposite end. The bracket 92 surrounds a support or guide bar 94 that extends between posts 18. The guide bar 94 has a notch 96 at one end which is adapted to receive the bracket 92 and lock the work supporting surface 54 in the working or horizontal position illustrated in FIG. 7. Two such notches are provided so that the bar can be mounted interchangeably.

In order to move the working supporting surface to the stored position illustrated in FIG. 6, it is only necessary to lift the board slightly and at the same time provide a clockwise pivotal force onto the rod 88 which will lift the bracket 92 out of the notch 96 and allow the shelf to be lowered to the position illustrated in FIG. 6. During this movement, the bracket 92 slides along guide bars 94.

According to one further aspect of the invention, a novel serving tray 100 has been developed which is incorporated into the grill 10 and forms a functional part thereof. The serving tray 100 is illustrated in FIG. 8 and includes a central portion 102 having L-shaped offset end portions 104 with gripping means 106 thereon.

The central portion 102 is configured so as to be receivable between the front and rear support members 12 and 14 so that the tray is suspended on the members 12 and 14 by the end portions 104. Thus, the tray can easily be removed simply by gripping the handle portions 106. If desired, a work supporting surface, such as the work supporting surface 54, may also be suspended on the cross members 12 and 14 below the serving tray 100.

The grill also incorporates igniter means for initially igniting the gas flowing into the tubes 34. The igniter means consists of an electrode assembly of the type disclosed in U.S. Pat. No. 4,302,181, assigned to the Assignee of the present invention, which is controlled by a pushbutton 112 (FIG. 1).

According to another aspect of the present invention, the barbecue grill also incorporates a smoker attachment for providing the desired flavor to the food that is being cooked. For example, it is well known that in many instances certain flavors may be desirable to enhance the taste of the food products. For example, many times hickory chips are utilized for producing smoke that will add to the flavor of the food. In addition, many times it is desirable to add moisture to the cooking environment to prevent the food from being dried out during the cooking process. When large items, such as turkeys, are being cooked, it is desirable to keep a somewhat moist environment within the grill.

As illustrated in FIGS. 9-13, the smoker attachment is generally indicated by reference numeral 200 and is preferably supported in a fixed position above the burner tubes with the top edge generally aligned with the cooking grid 57. The details of the smoker attachment are illustrated in FIGS. 11-13. As shown therein, the smoker attachment 200 consists of a generally rectangular hollow housing defined by first and second spaced side walls 202 and 204 and end walls 206 and 208. Preferably the end walls 206 and 208 are formed integral with the wall 202 which has reinforcing ribs 210 formed integral therewith. The bottom of the housing is preferably partially enclosed with a first plate 212 that is integral with the lower edge of the wall 202 and a second plate 213 integral with the wall 204. The plates define an elongated slot S. An apertured plate 214 is secured into the position illustrated in FIG. 12 by tabs 216.

The walls 202 and 204 have integral depending extensions 220 and 222 which define support means for the smoker within the grill. The extensions or plates 220 and 222 have at least a pair of triangular shaped openings 224 which correspond in dimension to the inverted V-shaped sear bars that define the sear grid 56. Thus, the housing can readily be supported in the proper position merely by inserting two of the sear bars through the aligned openings 224 and positioning the sear bars to the position illustrated in FIG. 9. It should also be noted that the plate 222 tapers away from the plate 220 so as to define a channel for directing heat from the gas burners through the apertures 214.

The smoker attachment also has a cover 230 which is pivotally supported by pivot pins 232 on the upper edge of the housing. In addition, a water tray 234 has an outwardly directed flange 236 which is configured to be received over the upper edge of the wall 204 so that the tray is suspended in the position, illustrated in FIG. 13. Preferably, the wall 204 has a cut-out portion 238 so that the lip 236 is located below the edge of the cover and defines a small space therebetween that allows for smoke to emanate from the unit. It should also be noted that the plate 222 tapers away from the plate 220 so as to define a channel for directing heat from the gas burners through the apertures 214.

In use, suitable smoke producing particles, such as wood chips or chunks, are introduced into the smoker onto the apertured plate 214 and the heat received through the aperture plate 214 is sufficient to ignite the particles and produce smoke. The narrow slot S prevents sufficient oxygen from entering the housing to prevent ignition of the wood. When the moisture content is required, the water tray may be inserted as shown and an adequate amount of water placed into the tray which will be evaporated from the heat flowing through the aperture plate 214 and produce steam. The smoke will flow through the narrow slot above the lip of the tray and will absorb steam and will then create a layer of smoke adjacent the cooking grid.

While the specific embodiments have been illustrated and described, numerous modifications come to mind without significantly departing from the spirit of the invention and the scope of protection is only limited by the scope of the accompanying Claims.

We claim:

1. In combination with a grill having a firebox with a cooking grid with side edges thereon disposed therein and a cover hinged thereto, the improvement of a cradle supported on said cover by support means with said support means being positioned so that said cradle is located totally within the confines of the cover and disposed above and to the side of one said side edge of said cooking grid when said cover is in an open position and is totally suspended by said cover over said firebox and disposed above and over a portion of said cooking cooking grid when said cover is in a closed position, said cradle including an upwardly-projecting pivot pin having an outwardly-extending portion at each end for cooperating with said support means.

2. The combination as defined in claim 1, in which said support means includes bracket means on opposite end walls of said cover.

3. The combination as defined in claim 2, in which said bracket means includes first and second brackets supported on respective end walls with said first bracket having an opening for receiving one pin means and said second bracket having an elongated upwardly-opening slot so that said cradle can be inserted in said cover by manipulation thereof.

4. In combination with a grill having a generally rectangular firebox with a cover hinged thereto, the improvement of a cradle support on said cover by support means, said cradle including an upwardly-projecting pivot pin having an outwardly-extending portion at each end for cooperating with said support means, said support means being positioned so that said cradle is located totally within the confines of the cover when said cover is in an open position and is totally suspended by said cover over said firebox when said cover is in a closed position, said firebox having a lower section for generating heat with a cooking grid adjacent an upper edge thereof and a sear grid assembly between said lower section and said cooking grid, further including a smoker attachment supported on said sear grid assembly and extending upwardly therefrom.

5. The combination as defined in claim 4, in which said smoker attachment includes a housing defining a chamber closed at its bottom and having an open top closed by a cover with said bottom having apertures to allow heat to flow into said chamber.

6. The combination as defined in claim 5, in which said housing is generally rectangular and said cover is hinged to one upper edge of said housing.

7. The combination as defined in claim 6, further including a water tray supported on an upper edge opposite said one upper edge.

8. The combination as defined in claim 7, in which said smoker attachment has plates extending below said bottom supported by said sear grid assembly, said plates extending from opposite edges of said bottom to channel heat through said apertures.

9. In a barbecue grill including a lower, generally rectangular housing having a generally rectangular cooking grid with side edges thereon supported adjacent an upper open edge and a cover hinged thereto along one upper edge and movable between open and closed positions, support means on opposite end walls of said cover and a cradle pivotally supported on said support means, said cradle including an upwardly-projecting pivot pin having an outwardly-extending portion at each end for cooperating with said support means, said support means being positioned such that said cradle is located totally within the confines of said cover and is located above and to the side of one said side edge of said cooking grid when the cover is open and is suspended above and over a portion of said cooking grid when said cover is closed.

10. A barbecue grill as defined in claim 9, including a frame structure supporting said housing and having a working surface pivotally supported thereon between a vertical stored position and a horizontal working position, and support means including a support rod pivoted on said working surface and having a guide bracket at an opposite end and a guide bar on said frame structure, said guide bar having a notch receiving said guide bracket to lock said working surface in said horizontal working position.

* * * * *